[22.]

S. A. Wing & J. G. Johnson
Axle Boxes.

No. 118,770.            Patented Sep. 5. 1871.

Witnesses:
C. Raettig.
Wm. H. C. Smith.

Inventors:
J. G. Johnson.
S. A. Wing.
per Munn & Co
Attorneys.

UNITED STATES PATENT OFFICE.

SENNITT A. WING AND IANTHUS G. JOHNSON, OF GREENFIELD CENTRE, N. Y.

IMPROVEMENT IN AXLE-BOXES.

Specification forming part of Letters Patent No. 118,770, dated September 5, 1871.

*To all whom it may concern:*

Be it known that we, SENNITT A. WING and IANTHUS G. JOHNSON, of Greenfield Centre, in the county of Saratoga and State of New York, have invented a new and Improved Axle-Box; and we do hereby declare that the following is a full, clear, and exact description thereof, which will enable others skilled in the art to make and use the same, reference being had to the accompanying drawing forming part of this specification.

This invention relates to improvements in axle-boxes; and it consists in an arrangement of the axle bearing eccentrically in a large center-box, which is arranged in the outer or pipe-box fitted in the hub of the wheel so that it can be adjusted on its axis to carry the axle-bearing forward of the center of motion of the wheel, whereby the gravity of the load will assist the draft.

Figure 1:
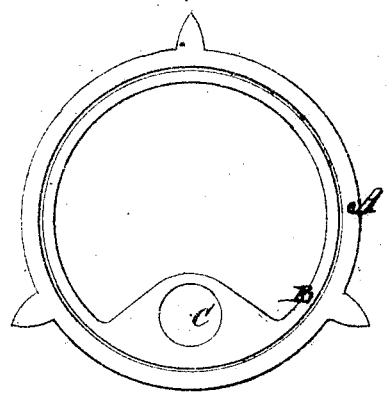
Figure 2:
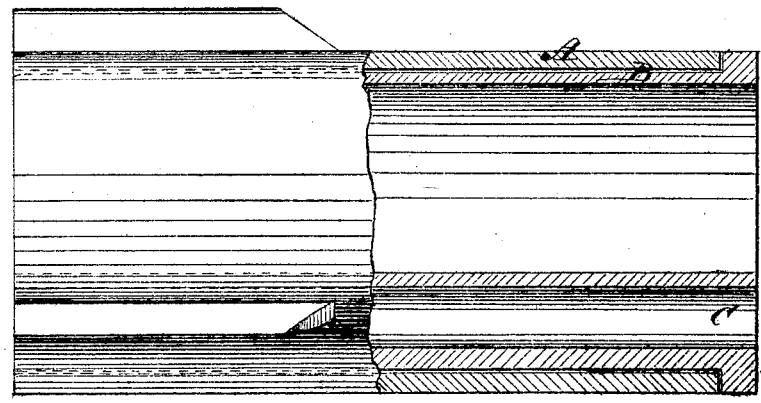

Figure 1 is an end elevation of my improved axle-box, and Fig. 2 is partly a side elevation and partly a longitudinal section.

Similar letters of reference indicate corresponding parts.

A is the outer or pipe-box, which is fitted in the hub of the wheel. B is the inner or center box fitting in A so as to be adjusted on its axis, as may be required, relatively to the axle, and attached thereto so as not to turn with the wheel, which is designed to turn on it. C is the axle-bearing made in the box B, eccentrically to its axis, so that by the adjusting of box B around in A the axle may be thrown forward or backward of the center of motion of the wheel, or it may be placed coincident with the vertical plane of said axis. The object of throwing it forward or backward is to have the weight of the load assist in propelling it, as it will do by thus being suspended on the wheel forward of its center of motion. The box B is made hollow for economy in weight of metal, which is not needed thereat, and being so affords a convenient means of lubricating by applying the lubricant through holes made through it to the bearing-surface.

Having thus described our invention, we claim as new and desire to secure by Letters Patent—

The combination, with the pipe-box A, of the center box B having the axle-bearing C arranged eccentrically to its axis, all substantially as specified.

S. A. WING.
IANTHUS G. JOHNSON.

Witnesses:
EDWARD A. ROOD,
CHARLES S. TUBBS.